Dec. 9, 1947.　　A. T. THOMPSON　　2,432,261
BEVERAGE CARBONATING AND DISPENSING CONTAINER
Filed Oct. 29, 1942　　2 Sheets-Sheet 1
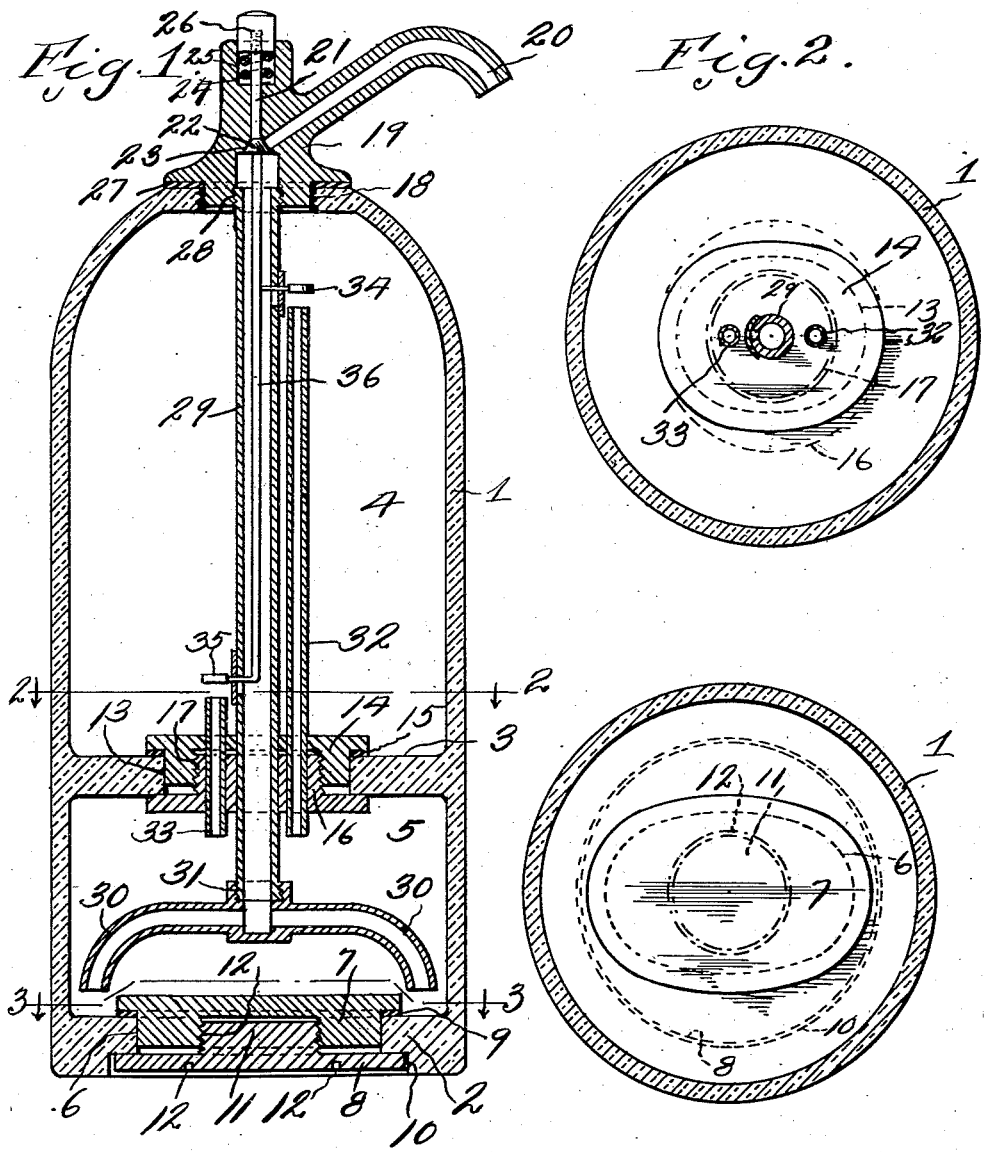
Inventor
Albert T. Thompson
By Philip A. Terrell
Attorney Dec. 9, 1947.     A. T. THOMPSON     2,432,261
BEVERAGE CARBONATING AND DISPENSING CONTAINER
Filed Oct. 29, 1942     2 Sheets-Sheet 2
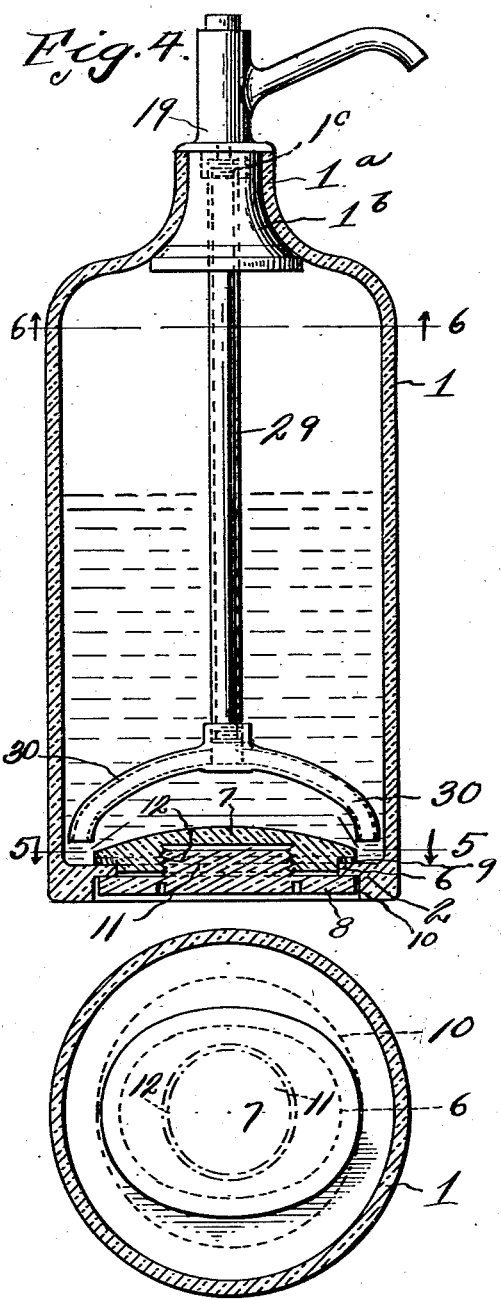
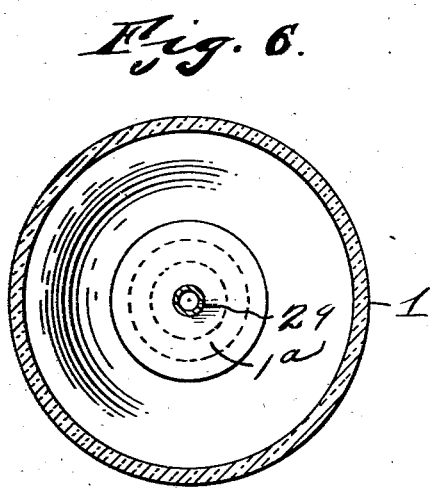
Inventor
Albert T. Thompson
By Philip A. Terrell
Attorney Patented Dec. 9, 1947

2,432,261

UNITED STATES PATENT OFFICE 2,432,261

BEVERAGE CARBONATING AND DISPENSING CONTAINER

Albert T. Thompson, New Orleans, La.

Application October 29, 1942, Serial No. 463,828

3 Claims. (Cl. 225—18)

The invention relates to dispensing devices, particularly of the charged water type, and has for its object to provide a device of this character in which carbon dioxide may be placed for carbonating the beverage, or if desired a beverage or the ingredients of a cocktail may be placed and carbonated as it is dispensed, or any beverage dispensed which may be carbonated.

A further object is to provide a device of this kind which may be bottom filled, and preferably with solid carbon dioxide.

A further object is to provide a siphon dispensing device comprising upper and lower compartments formed by a partition having a sectional bushing member therein and through which bushing a discharge tube extends to the discharge spout, and tubes leading from the upper compartment to the lower compartment through the separable bushing for directing carbon dioxide into the lower compartment and the beverage to be dispensed therein. Also valve means cooperating with said tubes for closing off the flow of carbon dioxide to the lower compartment when the dispensing faucet valve is open, thereby preventing foaming of the dispensed beverage.

A further object is to provide a bottom filled closure for the receptacle disposed in a bottom opening and of a size whereby all of the parts of the device, including the separable bushing, will pass therethrough for assembly purposes.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a vertical transverse sectional view through the mixing and dispensing device.

Figure 2 is a horizontal sectional view taken on line 2—2 of Figure 1.

Figure 3 is a horizontal sectional view taken on line 3—3 of Figure 1.

Figure 4 is a vertical transverse sectional view through a modified form of dispensing device.

Figure 5 is a horizontal sectional view taken on line 5—5 of Figure 4.

Figure 6 is a horizontal sectional view taken on line 6—6 of Figure 4.

Referring to the drawings, the numeral 1 designates the receptacle which may be formed of any material, and for purposes of illustration a glass one is shown. Disposed within the receptacle 1, spaced from the bottom 2 is a partition 3 dividing the receptacle into an upper compartment 4 and a lower compartment 5. The bottom of the receptacle is provided with an off-round filling opening 6, closed by a separable closure, comprising an inner off-round member 7, and an outer round member 8. The off-round member 7 is adapted to pass endwise into the compartment 5 after the filling operation and to seat on a gasket 9 engaging the inner side of the bottom 2 for forming an air-tight closure. The outer member 8 rotates in an annular channel 10 and is provided with an axial threaded portion 11 which threads at 12 into the inner member 7. To facilitate the tightening and removal of the outer section 8 spaced apertures 12 may be provided for the reception of a spanner wrench.

The partition 3 is provided with an off-round opening 13, through which the bushing section 14 may be passed in an endwise position for positioning its gasket 15 on the upper side of the partition, and the gastight connection is formed by the flanged member 16, which threads at 17 into the under side of the bushing member 14 and engages the under side of the partition, therefore it will be seen that an airtight connection is formed between the upper compartment 4 and the lower compartment 5.

Referring to Figures 2 and 3, it will be seen that the parts 14 and 7 can be passed upwardly through the off-round openings 6 and 13 to the position shown in Figure 1. Also the part 16, which is round, will pass through the off-round opening 6 in the bottom of the receptacle.

Threaded at 18 in the upper end of the receptacle 1 is a dispensing faucet head 19 having a discharge spout 20, and slidably mounted in the head 19 is a valve stem 21 having a valve 22 which cooperates with a valve seat 23.

The valve 22 is normally maintained closed by an expansion spring 24 interposed between the bottom of the recess 25 and the finger engaging member 26 threaded on the upper end of the valve stem 21. A compressible gasket 27 is provided between the head and the receptacle for forming an airtight connection. Threaded at 28 into the lower end of the head 19 on the axis of the bottle is a downwardly extending tube 29 which extends through registering apertures of the separable bushing sections 14 and 16 and terminates in the mixing chamber 5 and is provided with outwardly extending branch pipes 30 which are threaded at 31 to the lower end of the tube 29. The tube 29 is preferably inserted through the opening at the upper end of the receptacle and the branch pipes 30 through the opening 6, therefore it will be seen that these parts can be assembled. Disposed within the receptacle on one side of the tube 29 and extending through the bushing members 14 and 16 is a tube 32, which tube forms a communication between the upper end of the compartment 4 and the mixing compartment 5. The second tube 33, similar to the tube 32, forms a port of communication between the lower end of the chamber 4 and the mixing chamber 5. Both tubes are controlled by valves 34 and 35, which are carried by the extension stem 36, formed integral with the valve 22. It will be seen that when it is desired to dispense a mixed beverage that the ingredients are first placed in the mixing chamber 5, after the carbon dioxide chamber 4 has been filled. The expansion spring 24 normally maintains the valves 34 and 35 unseated, and hence the sublimed gas passes through tubes 32 and 33 to the mixing compartment 5 for the dispensing operation. The gases are of an expansive nature and carbonate the beverage. During the dispensing operation it is necessary to cut off the flow of gas from the compartment 4 to prevent foaming of the dispensed beverage. It will be seen that as the valve 22 is unseated, the valves 34 and 35 will seat on the tubes 32 and 33, thereby allowing the expanding gases of the carbonated beverage in the compartment 5 to discharge said mixed beverage through the discharge spout 20. When the pressure is relieved on the finger engaging member 26, valve 22 again seats and valves 34 and 35 are unseated, thereby allowing the pressure to again build up in the mixing chamber 5.

The device is filled with the ingredients by inverting the receptacle and placing the beverage ingredients and solid carbon dioxide therein until the upper compartment 4 and the lower compartment 5 are substantially filled, leaving enough room to allow insertion of the parts 14 and 16 in the opening 13 of the partition 3. During this operation the valve 22 remains closed, after which the separable bushing in partition 3 is placed in position, parts assembled including the insertion of tubes 33 and 32 which follows the assembling of parts 14 and 16 of the separable bushing in the opening of the partition 3, and then the branch pipes 30 are placed on the end of the tube 29. Following the above operation the bottom closure, involving parts 7 and 8, are assembled in the bottom 2 of the receptacle. After the above operation the receptacle is placed in upright position with the faucet upwardly disposed. A carbonated beverage from the compartment 4 then flows downwardly to the compartment 5 through the tube 33 until the compartment 5 is completely filled, eliminating air space in compartment 5, and then the gas eliminated from compartment 5 passes upwardly through tube 32 and discharges into the upper end of compartment 4 above the carbonated mixture therein. When it is desired to dispense beverage through the faucet 20 the valve 22 is unseated, thereby forcing valve rod 36 downwardly and seating valve 35 on the upper end of tube 33 simultaneously with the seating of the valve 34 on the upper end of the tube 32. When valves 34 and 35 are in closed position the expansive action of the carbon dioxide in the beverage in the filled compartment 5 forces the beverage through pipes 30 and then upwardly through tube 29 past open valve 22 to the dispensing point 20. When valve 22 is again closed, following the above dispensing operation, the above operation can be repeated. It will be seen that tubes 33 and 32 can be passed through the bushing sections 14 and 15 after the sections 14 and 15 have been tightened to a point where their apertures are in alinement.

Referring to the modified form of device shown in Figures 4 and 5, the partition 3 is eliminated, and the beverage is discharged through the branch pipes 30 and dispensing tube 29; otherwise the construction is the same as that shown in Figure 1, and the same numerals apply thereto. The receptacle 1 is provided with a neck 1a in which is seated a plug 1b for packing purposes and the tube 29 extends upwardly through the plug and is threaded at 1c into the faucet head 19. It will be noted that all of the parts can be assembled in the receptacle through the off-round opening 6 in the bottom 2 of the receptacle.

From the above it will be seen that a beverage receptacle is provided in which ingredients for mixed drinks may be placed, and the beverage carbonated as discharged. The carbonating element is preferably carbon dioxide, however a soda may be used if desired.

The invention having been set forth what is claimed as new and useful is:

1. A beverage mixing device comprising a receptacle having a chamber therein, a partition within said chamber and dividing said chamber into an upper gas receiving chamber and a lower beverage receiving chamber, a closed filling opening carried by the bottom of the receptacle, a separable bushing disposed in an off-round opening in the partition, a discharge faucet carried by the upper end of the receptacle, a downwardly extending discharge tube carried by the faucet and extending through the separable bushing carried by the partition and terminating in the lower compartment, a valve carried by said faucet, two ports of communication between the upper and lower chambers through the separable bushing, valves cooperating simultaneously with said ports for opening and closing the same, and means connecting said last named valves and the faucet valve whereby carbonated beverage will pass from the upper compartment to the lower compartment when the valve is closed and the carbonated beverage will pass to the faucet valve and faucet from the lower compartment when the faucet valve is opened.

2. A device as set forth in claim 1 wherein the means of communication between the upper and lower chambers comprises tubes extending through the separable bushings in the partition and forming communication ports between the upper and lower ends of the upper chamber and the lower chamber, a valve rod carried by the faucet valve, said valve rod being disposed in the discharge tube and valves carried by said valve rod and disposed to the outside of the discharge tube and cooperating with the tubes extending through the separable bushing for cutting off the flow of carbonated beverage from the upper to the lower chamber when the faucet is opened for a dispensing operation and allowing the flow of carbonated beverage to the lower chamber when the faucet valve is closed.

3. A device as set forth in claim 1 wherein the separable bushing comprises an upper section above the partition, a lower section below the partition, a threaded connection between said section, said bushing closing an off-round opening through the partition, said upper section being so shaped and proportioned whereby it may be passed upwardly through the partition opening.

ALBERT T. THOMPSON.

REFERENCES CITED

The following references are of record in the file of this patent:

UNITED STATES PATENTS

| Number | Name | Date |
|---|---|---|
| 565,922 | Prax | Aug. 18, 1896 |
| 2,283,066 | Ingersoll | May 12, 1942 |
| 349,651 | Jacobs | Sept. 21, 1886 |
| 2,096,088 | Copeman | Oct. 19, 1937 |

FOREIGN PATENTS

| Number | Country | Date |
|---|---|---|
| 20,767 | Switzerland | Jan. 19, 1900 |
| 776,875 | France | Nov. 17, 1934 |